: # 2,708,982

FILTER MEDIA

Thomas J. McGuff, Norwood, and Roland W. Sawyer, West Groton, Mass.

No Drawing. Application July 8, 1947, Serial No. 759,723

18 Claims. (Cl. 183—51)

This invention relates to filter media of the type designed to remove solid and liquid particles (dispersoids) from gases. More particularly stated, the invention concerns itself with materials, whose use requirements are primarily permeability to the passage of gases of all kinds and impermeability to solid or liquid particles that may be suspended in said gases.

The particles may be of the nature of carbon or of partially carbonized material such as smoke; they may be in the form of dusts such as are picked up by wind or are found in mines or industrial plants; or they may be in the form of sprays, fogs, or condensed vapors. Hence, the invention is not limited to any particular air or gas-borne particle, and is not limited as to whether the gaseous medium is to be used for industrial purposes, or, in the case of air or a gas containing oxygen, is to be breathed by human beings or animals.

The materials of the invention are particularly adapted for use as filtering media in safety devices such as gas masks, respirators and air-conditioning devices for industrial plants and mines. They are also suitable for use in the form of large sheets for the purification of gases such as air to be employed directly for industrial uses or for breathing.

Filter media of the prior art were made from various substances such as sheets of cellulose pulp, cotton, felt, etc., either plain or impregnated with carbon, wax or similar substances, but they have not proved entirely satisfactory for several reasons.

In the first place, many of the prior art filtering media are effective only in removing relatively large contaminating particles. Recent emphasis has centered on very small particle size for producing man-made smokes with greater screening power, greater stability from settling, greater toxicity, etc. Even in the field of natural fogs, dusts, or smokes, increasing objection is being made to contaminating particles whose particle size is small by comparison with those previously studied.

In the second place, many prior art filtering media are not sufficiently permeable to gases to permit their use where a fairly rapid rate of gas flow is required. This is a particularly important consideration in the case of respiratory devices, which of necessity must permit a sufficiently rapid flow of air to support breathing with relative comfort for long periods at a time.

In the third place, many of the prior art filtering media cannot withstand exposure to liquid-type smokes or contaminating particles without soon becoming ineffective. In the case of some, when the fibers become wet with the liquid type smokes, filtration is greatly reduced or stopped either because of channeling or some other reason, and large quantities of contaminating particles are allowed to pass. In the case of other filters, the liquid particles coalesce and tend to plug the filter to a point where the resistance to air or gas flow is too high for the intended purpose.

An important object of this invention is to provide filter media capable of removing substantially all particles in a fog or smoke including those in the range of a few tenths micron diameter (cross section).

It is to be noted at this point that according to the theory of filtration, the particle size most difficult to filter falls in the range of 0.20–0.25 micron diameter for perfect spheres. With increasing size, the increasing inertia of the particle acts to cause the particle to impinge on a fiber. With decreasing size, the amplitude of the Brownian oscillation increases and acts to bring the particle more easily into contact with a fiber. According to this theory, once a particle comes into contact with a fiber it is permanently removed from the medium being filtered. This is true only if the area of contact between the fiber and particle is sufficiently large to offer enough attractive forces to overcome the inertia of the particle.

Another important object is to provide filter media capable of filtering liquid-type smokes or fogs without "breaking," channeling, or otherwise becoming ineffective on long exposures at relatively high or low concentrations.

Another important object of this invention is to provide filter media capable of filtering smokes or fogs free from suspended material without greatly increasing the resistance to the flow of gas or air when exposed for long periods of time at relatively high or low concentrations.

Another important object of the invention is to provide filter media having exceptionally high permeabilities to air and other gases, and which are impermeable for all practical purposes to suspended particles of all kinds.

Another important object is to provide filter media, which are capable of removing particles of all kinds from gases having very low dust or fog concentrations as well as from gases having very high dust or fog concentrations.

The importance of this object can be seen from the fact that dust concentrations can vary as much as from five and less grains per cubic foot to several hundred grains per cubic foot. Relatively small dust concentrations may render air a health hazard, and may contaminate the air so that it cannot be used industrially without purification. Furthermore, in many cases, as for instance in mines, dust concentrations may cause disastrous explosions.

Another object is to provide filter media, which are very economical in that they can be made in a very inexpensive and relatively simple manner from inexpensive materials, with the resulting advantage that they may be discarded after normal periods of use.

A further object of importance is to provide filter media, which can be readily handled and made into sheets or webs over conventional papermaking machines, and which can be molded into various forms by means of conventional pulp-molding equipment.

This invention is based in part upon the discovery and realization that the selectivity of a fiber in a filtering medium for removing suspended particles in the size range under consideration from a fog or smoke is inversely proportional to the diameter of the fiber (to a theoretical limit of 0.20–0.25 micron particle diameter). In other words, as the particle size decreases, the fiber diameter of the filter-active material must be reduced in order to maintain maximum efficiency.

It has been found by actual experiment that for removing infinitesimally small particles (0.20–0.30 micron diameter), filtering media should contain a large proportion of uniformly distributed fibers having diameters of .0003–.0010 mm. The nature of the fibers themselves does not appear to be of any particular importance, provided they will not swell or deform in the presence of the smoke or fog to be filtered. Any natural or synthetic fiber such as glass, asbestos, rayon, vinyon or nylon may be used, provided that it has the required small diameter or can be accurately graded for size. Because of practical considerations, materials which consist substantially entirely of fibers of less than a micron in diameter and which therefore do not have to be graded are used for carrying out the teachings of this invention. Two grades of asbestos, namely blue African and blue Bolivian have been found particularly suitable.

It has been found to be impracticable for most purposes to provide a filtering medium consisting entirely of fibers having diameters less than one micron. Such filter medium presents too great a resistance to the passage of air, and is inefficient as far as the larger size particles are concerned. In the case of certain fibers such as asbestos, the felted web would be too weak mechanically to serve as a practical filtering medium.

It follows, therefore, that the fibers of very small diameter must be dispersed among coarser fibers in order to produce filter media of requisite strength, which will remove suspended particles of both large and small size, and which will not present too great resistance to the passage of the gas to be filtered. It was found in practice that the fine fibers must be very uniformly and homogeneously dispersed among the coarser fibers. The filter medium must be free of areas where the contaminating particles can pass without impinging on a fiber capable of removing the particle permanently from the gas or air stream.

A very important problem solved by the invention was to provide an effective method of uniformly and homogeneously dispersing fibers of vry fine diameter with other larger fibers, some of which serve as carrier fibers, some as strength-imparting fibers, and others as filter-active fibers for larger particles. It was found in practice that when it is attempted to mix very fine fibers such as asbestos with much larger fibers, there is a great tendency for the fine fibers to agglomerate or ball-up. This is apparently due to the fact that asbestos fibers have diameters of only 1/10 to 1/20 of the smallest common paper making fibers, so that there is too wide a range between the kinds of fiber to be mixed to render possible a uniform and homogeneous distribution of the fine fibers among the coarse ones.

The problem was solved by utilizing fibers of intermediate diameter for admixture with the very fine fibers so as to increase step-wise the length and diameter of the fibers in the web from the smallest to the largest. In this connection, it is to be noted that not only are the fiber dimensions important, but such other characteristics are required as to render the fibers suitable for papermaking techniques and procedures. Furthermore, the fibers have to be such as not readily to hydrate (in the papermaking sense) upon refinement.

Two fibers of intermediate dimensions and having the desirable characteristics are those obtained from esparto grass (*Lygeum spartum* and *Stipa tenacissima*) and from leaf and stem of the plant of the genus Yucca.

Plants of this genus are found throughout the world, particularly in tropical and semi-tropical climates and predominately in semi-arrid zones. The invention is not limited to any particular species of the Yucca. As examples of species which are suitable may be mentioned those known locally as soap weed, bear grass, Adam's needle, bayonet and dagger plant, and botanically as *Yucca filamentosa, elata, glauca, aloifolia, angustifolia, baccata, brevifolia, draconis, puberula, whipple* and *gloriosa*.

Both classes of fibers (esparto and yucca) are characterized by a small diameter (.006–.014 mm.) and rather uniform length in relation to breadth.

For the purposes of this invention, we prefer to classify the common fibers into three groups based upon their diameter (cross section):

| Class | Diameter, mm. | Examples |
| --- | --- | --- |
| 1. Large | .020–.030 | Cotton, jute, hemp, Manila, woodpulp. |
| 2. Intermediate | .006–.015 | Esparto, yucca, some straws, bagasse. |
| 3. Small | .0003–.0010 | Blue Bolivian asbestos, blue African asbestos, synthetic fibers. |

It will be observed that all of the common papermaking fibers of this country fall into the group with large diameters, and that fibers of intermediate diameters are available from esparto, yucca, some straws, and bagasse. Of these, only esparto and yucca were suitable for our purpose, because the others hydrate excessively upon refinement, or are otherwise unsuitable for forming a web of the desired characteristics.

A very important feature of this invention, then, is the functional use of esparto and/or yucca as a source of fibers with intermediate diameters and uniform length in relation to width suitable for homogeneously dispersing fine fibers like asbestos among large fibers common in the papermaking trade. It has also been demonstrated that esparto and/or yucca fibers of themselves are capable of completely dispersing asbestos fibers in a web containing none of the larger class of fibers. However, webs containing asbestos and esparto and/or yucca are usually not strong enough mechanically for all practical purposes, and other larger fibers are necessary for increased porosity, strength, and/or improved folding qualities.

Abundant evidence has been gathered by means of an electronic smoke penetration meter to prove that this functional use of esparto and/or yucca is a real phenomenon. This is a device in which liquid smoke of a given concentration and particle size is generated and passed through various filter media. The filtered smoke from such examples is then led into a suitable photoelectric light scattering device for measuring the concentration of smoke remaining in the filtered air.

In all cases, there is a clear and unmistakable difference between samples of asbestos-bearing paper with and without fibers of the intermediate size (esparto and/or yucca). Filter media containing esparto and/or yucca clearly outperform similar media containing none of the intermediate sized fibers. Further inspection of the samples under a microscope shows excellent distribution of the asbestos where the intermediate sized fibers are present, and poor distribution of the asbestos in the absence of the intermediate sized fibers.

As has been stated, all species of the yucca and esparto family of plants are suitable for the purposes of this invention. They all yield fibers which meet the specified requirements, though it is to be noted that they differ among themselves somewhat in the yield of fiber, ease of conversion into papermaking fibers, and content of soapy material and other undesirable substances such as pith and cellular materials, which must be removed before the fiber can be made into a paper or felted mass.

The relative proportions of differently dimensioned fibers are of considerable importance, and depend upon a number of factors such as the particular filter specifications to be met, whether or not the admixture contains coarser fibers in addition to the very fine and intermediate fibers, the nature and uniformity of the various types of fibers, etc.

As a general rule, it may be stated that for most purposes the filter media of the invention must contain at least 10% yucca and/or esparto and preferably more than 25%. The proportion of asbestos or other fine fibers depends upon the grade of the fine fibers. Blue Bolivian asbestos is somewhat coarser than blue African. Depending upon the particular specifications of the filter media, we prefer to use from 15-25% blue Bolivian or from 5-10% blue African, the difference being due almost entirely to fiber diameter.

When fibers other than yucca and esparto are added to the furnish, the proportion of fine fiber (e. g. asbestos) remains about the same as when a third fiber is not used. However, it is important to note that the third fiber must be of such character as not to impair the porosity of the web.

To meet any particular filter specifications for air resistance and smoke penetration, the proportion of fine fibers cannot be varied more than about plus or minus 2%. For those applications where smoke penetration must not exceed .005%, the proportion of blue Bolivian asbestos may be as high as 30%. On the other hand, where smoke penetration may be as high as 5%, the proportion of blue African asbestos may be as low as 3%.

As has been stated, the relative amounts of asbestos can be varied only within very narrow limits for a given filter performance. The relative proportions of intermediate and coarser fibers can be varied over much wider limits. For instance, very acceptable filter media have been made for use by the United States Navy using as high as 95% yucca and as low as 34.8% esparto. The reason why the intermediate and coarser fibers can be varied much more than the very fine fibers is that they are used for fiber gradation to disperse the very fine fibers and to keep the sheet porous. However, it is to be noted that if hemp is added to strengthen the sheet, it should not exceed 5-8%, because it hydrates rather easily and tends to close up the sheet.

The raw fibrous material may be treated in various ways to render it suitable for the purposes of the invention. Cooking with 5 to 25% caustic soda or soda ash with or without sodium sulphide is given as an example of a treatment, which has been found very effective in actual practice. However, it is to be noted that the invention is not restricted to any particular chemical treatment, as the important thing is to remove the lignin or cortex and the other undesirable constituents from the fibers, while maintaining the uniform ratio of length to thickness.

After the raw fibrous material has been treated to remove the undesirable constituents, the purified fibers together with other necessary fibers are made into a sheet or web of paper in any way known to the art of papermaking, as by formation on a cylinder mold or on a Fourdrinier, by hand, or by any other molding process.

The preferred method of forming the sheet or web is by means of a Fourdrinier. It will be understood that when making the sheet or web in this manner, the flow of stock onto the wire, the position of the dandy roll, the vacuum in the suction boxes, the pressure, the number of presses, etc. may be adjusted to obtain a paper, which will meet such specifications in weight, thickness, tear, tensile and other physical properties as may be required by a purchaser for some particular ultimate use.

As examples of the class of larger fibers used in these filter media for increasing the physical strength of the web may be mentioned manila, sisal, caroa, cotton, slightly beaten rope, causticized or mercerized fibers of sulphate, sulphite, or rag, or such fibers which have been treated with caustic to remove the gel-like materials and to render them of high alpha cellulose content.

The following examples are given by way of illustration:

*Example I*

A digester of conventional form was charged with 2,000 pounds of the plant and roots of the *Yucca elata*, 750 pounds of 40% liquid caustic soda (equivalent to 300 pounds of dry caustic), 100 pounds of sodium sulphide and 800 gallons of water to completely cover the yucca fibers. The contents were cooked for five hours at 40 pounds pressure, after which the liquor was blown and drained off.

The cooked fibers were then transferred to a washing beater to remove the last traces of cooking liquor, and then removed to a drainer. The yield was 1000 pounds. The drained fiber was then treated with 800 pounds of caustic soda in 700 gallons of water at room temperature to crinkle or puff the fiber. The reaction was stopped at the end of fifteen minutes by washing the fibrous material with water. This decreases the yield to approximately 750 pounds.

While the yucca fiber was being causticized, 40 pounds of blue African asbestos were placed in a beater with sufficient water to allow the beater to circulate the fibers, and the asbestos was circulated with the beater roll set at a light brush for 30 minutes. It is to be noted that the water in the beater was 8 inches deep.

Then 750 pounds of the causticized and washed yucca fiber were added to the beater containing the asbestos, water was added to the usual level, bringing the contents of the beater to 2500 gallons, and the beater was circulated with the roll raised above the bedplate for thirty minutes for the purpose of thoroughly mixing the yucca and asbestos fibers.

The next step was to drop the stock into the beater chest, and to dilute it to a 3% consistency. The diluted stock was run through a Jordan with the plug pulled out, and was then run onto the wire of a Fourdrinier paper machine, on which a web of paper was formed in the usual manner and dried.

The product was a web of paper containing 5% of blue African asbestos and 95% causticized yucca, and having a thickness of .040", and a basis weight of 110 pounds per ream of 500 sheets 24" x 36".

*Example II*

Three thousand pounds of esparto grass, 1500 pounds of 40% liquid caustic (equivalent to 600 pounds of dry caustic—20% on the weight of the esparto), and 1000 gallons of water were placed into a digestor and cooked for six hours at a pressure of 40 pounds. The liquor was then drained off, and the residual caustic removed by washing. This stock was then further causticized to crinkle or puff the fiber by adding 18% caustic solution at room temperature in the ratio of 5 parts solution to 1 part of dry fiber. After 30 minutes the stock was thoroughly washed and made ready to furnish in a beater with the other fibers. The yield was approximately 1000 pounds.

While the esparto was being causticized, 192 pounds of blue Bolivian asbestos was placed in a beater with sufficient water to allow the fibers to circulate under the roll and the asbestos was circulated with the beater roll set at a light brush for 30 minutes.

Then 600 pounds of the causticized and washed esparto was added to the beater containing the asbestos and water was added to the usual level. Following that, 300 pounds of cotton flock (cut ⅛" long from staple) and 58 pounds of cooked and washed hemp fiber were added. This stock was then circulated for 30 minutes with the roll up to thoroughly mix the fibers. The resulting pulp was then passed through a Jordan with the plug out, and run onto the wire of a Fourdrinier machine where a web of paper .050" thick, having a basis weight of 100 pounds (500 sheets 24" x 36") was formed.

The product contained 16.7% blue Bolivian asbestos, 52.2% causticized esparto, 26.1% cotton flock, and 5% prepared hemp.

*Example III*

Eighty pounds of blue African asbestos was placed in a beater with enough water to allow circulation, and beaten for thirty minutes with the beater roll set at a light brush.

Causticized yucca pulp (350 pounds), treated as in

Example I and causticized esparto pulp (350 pounds) treated as in Example II, and ⅛" cut cotton flock (350 pounds) and prepared hemp fiber (70 pounds) were then added. Enough water was run in to reduce the consistency to 3% and the mass was circulated for forty-five minutes with the beater roll raised. The resultant stock was then pumped through a Jordan with the plug pulled back, and finally onto the wire of a Fourdrinier machine. A web of paper was formed having a thickness of .045" and a basis weight of 120 pounds per ream of 500 sheets 24" x 36".

The product contained 6.6% blue African asbestos, 29.2% causticized yucca, 29.2% causticized esparto, 29.2% cotton flock, and 5.8% prepared hemp.

*Example IV*

Three hundred pounds of blue Bolivian asbestos was placed in a beater with enough water to allow circulation, and beaten for forty-five minutes with the beater roll set at a light brush.

Four hundred sixty pounds of causticized esparto, treated as in Example II, 460 pounds of fine rayon flock (cut ⅛" long), and 100 pounds of prepared hemp fiber were then added to the beater with the normal amount of water. The stock was allowed to circulate 30 minutes with the beater roll raised off the bedplate. This stock was then pumped through a Jordan with the plug pulled back and run onto the wire of a Fourdrinier machine. A web of paper was formed .035" thick having a basis weight of 110 pounds per ream of 500 sheets 24" x 36".

The product contained 22.7% blue Bolivian asbestos, 34.8% causticized esparto, 34.8% rayon flock and 7.7% prepared hemp.

The above examples are intended for illustration only and are not meant to limit the proportions of any or all of the fibers in any way. It will be observed that a substantial amount of the intermediate sized fibers has been used in each case, although it can be varied over a wide range depending on the desired characteristics of the finished product. It will also be observed, in general, that less blue African asbestos is necessary than blue Bolivian asbestos for approximately equal filtering properties. This is due to the fact that the fibers of the former are somewhat finer than those of the blue Bolivian and more fibers are contained per unit weight.

The range of smoke penetration and air resistance for the products of the four examples are approximately the same. When liquid smoke of 0.30 micron diameter particle size at a concentration of 150 micrograms per liter was passed at 85 liters per minute through one ply of sample material with 100 square centimeters area, the smoke penetration was less than 0.25% and the drop across the sample was 100–140 millimeters of water. It is to be noted that some samples read as low as 0.05% smoke penetration at 110 millimeters water pressure drop.

Other filter media have been made in accordance with the principles of this invention which show greater smoke penetration and lower resistance and also lesser smoke penetration and higher resistance than the examples cited. Whereas the filter media of those examples cited are suitable for gas mask purposes and other safety devices where human breathing is a factor, the illustrations are not meant in any way to limit the scope of this invention. This application is a continuation-in-part of application Serial No. 513,922, filed December 11, 1943.

We claim:

1. A filter medium for separating suspended particles from gases consisting essentially of a water-laid sheet of interfelted substantially unhydrated fibers, at least 5% by weight of said fibers having a diameter less than a micron and the remainder of said fibers having diameters greater than one micron, the finer fibers being substantially uniformly and homogeneously distributed among the coarser fibers.

2. The filter medium defined in claim 1, the finer fibers being asbestos.

3. The filter medium defined in claim 1, the coarser fibers being selected from the class consisting of yucca and esparto.

4. The filter medium defined in claim 1, the finer fibers being asbestos and the coarser fibers being selected from the class consisting of yucca and esparto.

5. A filter medium for separating suspended particles from gases consisting essentially of a water-laid sheet of interfelted fibers, at least about 5% by weight being defiberized blue asbestos having a diameter less than one micron, at least about 10% by weight being selected from the class consisting of yucca and esparto, and the remainder consisting essentially of one or more coarser fibers, the asbestos being substantially uniformly and homogeneously distributed among the other fibers.

6. A filter medium for separating suspended particles from gases consisting essentially of a water-laid sheet of interfelted fibers, not more than 30% by weight of said fibers being asbestos having a diameter less than one micron, a substantial proportion of the fibers being selected from the class consisting of yucca and esparto, the asbestos fibers being substantially uniformly and homogeneously distributed among the other fibers.

7. A filtering medium for separating suspended particles from gases consisting essentially of a water-laid sheet of interfelted fibers, about 5% by weight of said fibers being defiberized blue asbestos and the remainder being causticized yucca, the asbestos fibers being substantially uniformly and homogeneously distributed among the yucca fibers.

8. A filtering medium for separating suspended particles from gases consisting essentially of a water-laid sheet of interfelted fibers, about 15% by weight of said fibers being defiberized blue asbestos, about 50% by weight being causticized esparto, and the remainder being cotton flock and hemp, the asbestos being substantially uniformly and homogeneously distributed among the other fibers.

9. A filtering medium for separating suspended particles from gases consisting essentially of a water-laid sheet of interfelted fibers, about 5% by weight of said fibers being defiberized blue asbestos, about 30% by weight being causticized yucca, and the remainder being cotton flock and hemp, the asbestos being substantially uniformly and homogeneously distributed among the other fibers.

10. A filtering medium for separating suspended particles from gases consisting essentially of a water-laid sheet of interfelted fibers, about 20% by weight of said fibers being defiberized blue asbestos, about 35% by weight being rayon flock and the remainder being hemp, the asbestos being substantially uniformly and homogeneously distributed among the other fibers.

11. A method for uniformly and homogeneously distributing a mass of fibers having diameters less than one micron with a mass of coarser fibers, which consists essentially in thoroughly admixing said fibers with a mass of fibers selected from the class consisting of yucca and esparto, and then admixing said mixture with a mass of coarser fibers.

12. A method for making a filter medium for separating suspended particles from gases, which consists essentially in dispersing a mass of fibers having a diameter less than a micron with fibers selected from the class consisting of yucca and esparto and then forming said mixture into a water-laid sheet of interfelted fibers.

13. A method for making a filter medium for separating suspended particles from gases, which consists essentially in dispersing a mass of fibers having a diameter less than a micron with fibers selected from the class consisting of yucca and esparto, admixing the said dispersion of fibers with fibers having a diameter greater than the yucca and esparto, and then forming said mixture into a water-laid sheet of interfelted fibers.

14. A filter medium for separating suspended particles from gases consisting essentially of a compacted mass of interfelted, randomly oriented, substantially unhydrated fibers, at least about 5% by weight of said fibers having diameters between .0003–.0010 millimeter and the remainder of said fibers having diameters greater than .0010 millimeter, the finer fibers being substantially uniformly and homogeneously distributed among the coarser fibers.

15. A filter medium for separating suspended particles from gases consisting essentially of a compacted mass of interfelted fibers, at least about 5% by weight thereof being defiberized blue asbestos, the predominating portion of the remainder being substantially unhydrated causticized cellulose fibers, the asbestos fibers being substantially uniformly and homogeneously distributed among the cellulose fibers.

16. A filter medium for separating suspended particles from gases consisting essentially of a compacted mass of interfelted substantially unhydrated fibers, more than about 50% by weight of said fibers being a mixture of defiberized blue asbestos and substantially unhydrated causticized cellulose fibers.

17. The filter medium defined in claim 16, said causticized cellulose fibers being selected from the group consisting of yucca and esparto and mixtures thereof.

18. A method for uniformly and homogeneously distributing a mass of fibers having diameters less than one micron with fibers having diameters in the order of 20 microns, which consists essentially in thoroughly dispersing the fibers having the diameters less than one micron with fibers having diameters between 6 and 15 microns, and then admixing said mixture with the fibers having the diameters in the order of 20 microns.

References Cited in the file of this patent

UNITED STATES PATENTS

| Number | Name | Date |
|---|---|---|
| 486,339 | Johnston | Nov. 15, 1892 |
| 1,179,229 | Shartel | Apr. 11, 1916 |
| 1,368,540 | Bovard | Feb. 15, 1921 |
| 1,489,330 | Moses | Apr. 8, 1924 |
| 1,500,500 | Kaye | July 8, 1924 |
| 1,574,208 | Shopneck | Feb. 23, 1926 |
| 1,757,757 | Schwartz | May 6, 1930 |
| 1,782,784 | Manning | Nov. 25, 1930 |
| 1,786,361 | Pahl | Dec. 23, 1930 |
| 1,786,669 | Manning | Dec. 30, 1930 |
| 1,845,444 | Sawyer | Feb. 16, 1932 |
| 1,854,414 | Milkey | Apr. 19, 1932 |
| 1,854,427 | Riebel | Apr. 19, 1932 |
| 1,857,100 | McCormick | May 3, 1932 |
| 1,861,044 | Ballard | May 31, 1932 |
| 1,893,048 | Birkholz | Jan. 3, 1933 |
| 1,901,438 | Davidson | Mar. 14, 1933 |
| 1,947,103 | Plumstead | Feb. 13, 1934 |
| 2,020,646 | Hornstein | Nov. 12, 1935 |
| 2,056,001 | Dahlman | Sept. 29, 1936 |
| 2,078,197 | Hooker | Apr. 20, 1937 |
| 2,152,901 | Manning | Apr. 4, 1939 |
| 2,477,000 | Osborne | July 26, 1949 |

FOREIGN PATENTS

| Number | Country | Date |
|---|---|---|
| 37,900 | Germany | Apr. 24, 1885 |
| 380,965 | Great Britain | Sept. 29, 1932 |
| 395,918 | Great Britain | July 27, 1933 |
| 482,137 | Great Britain | Mar. 24, 1938 |

OTHER REFERENCES

Wangaard, The Paper Industry, October 1937, pp. 777–784.

West, Paper Making Materials, pages 190–197 (1928).